L. E. WHITON.
CENTERING MACHINE.
APPLICATION FILED FEB. 16, 1910.
1,017,193.
Patented Feb. 13, 1912.
2 SHEETS—SHEET 1.
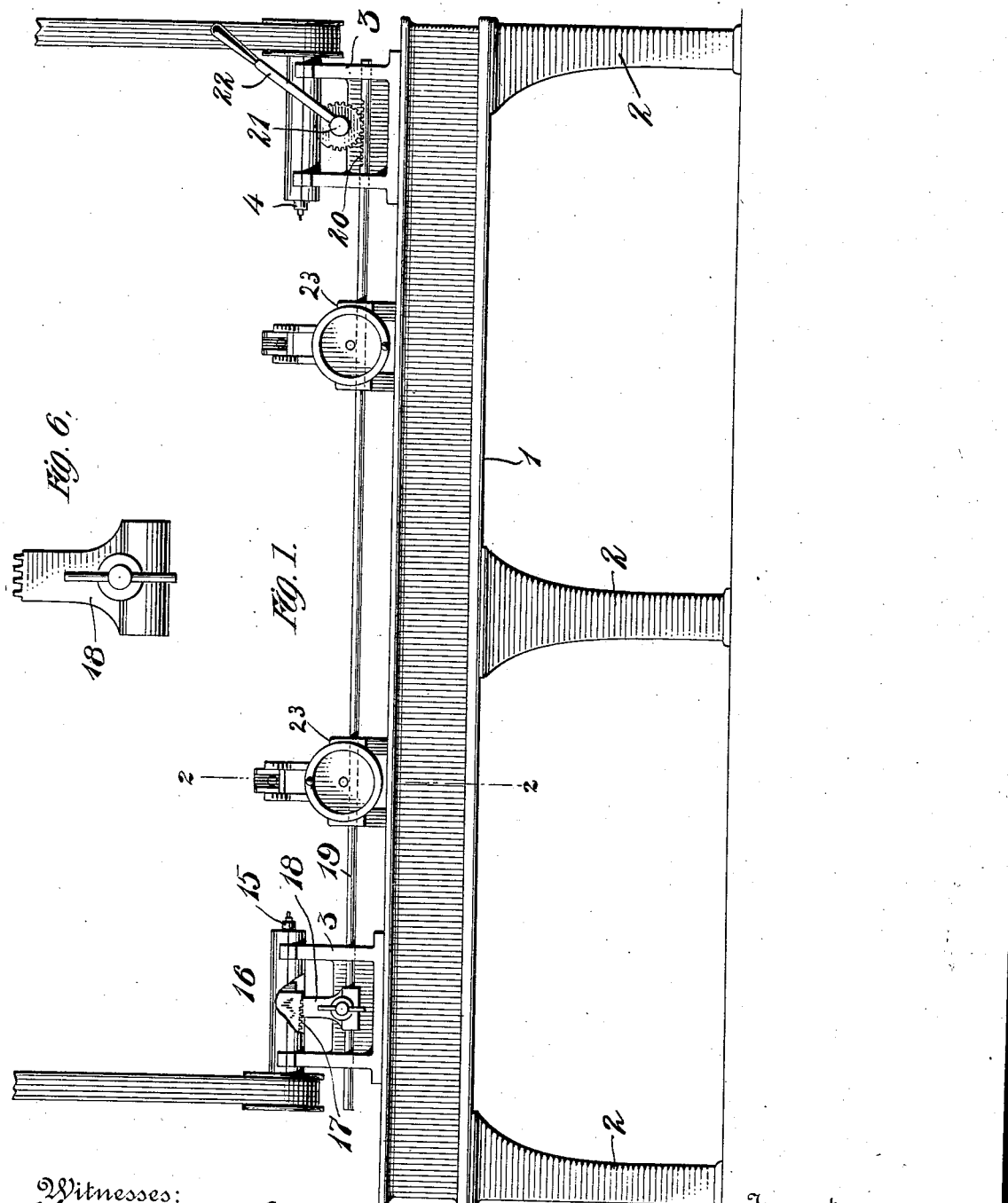

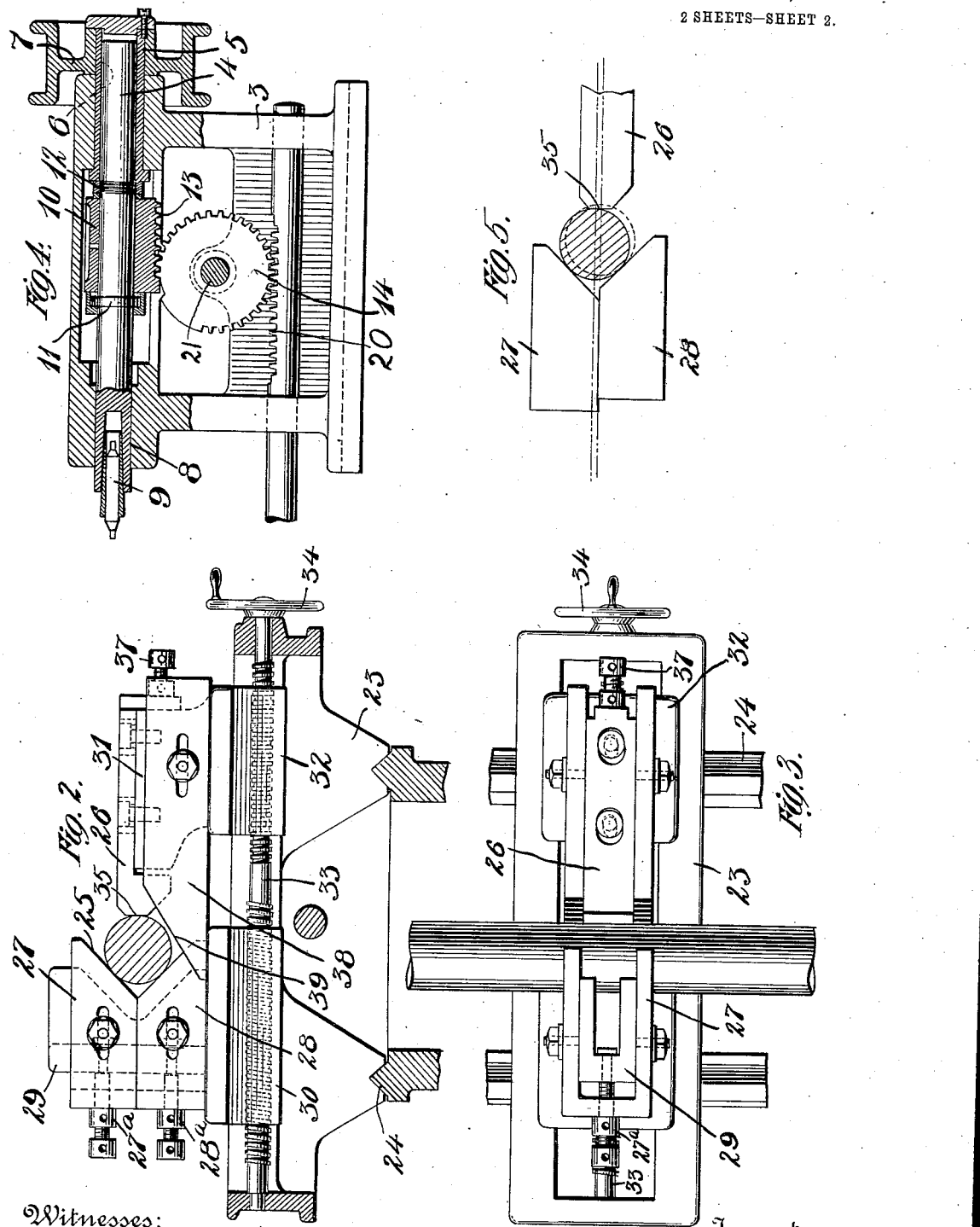

UNITED STATES PATENT OFFICE.

LUCIUS E. WHITON, OF NEW LONDON, CONNECTICUT.

CENTERING-MACHINE.

1,017,193. Specification of Letters Patent. Patented Feb. 13, 1912.

Application filed February 16, 1910. Serial No. 544,188.

*To all whom it may concern:*

Be it known that I, LUCIUS E. WHITON, a citizen of the United States, residing at New London, county of New London, State of Connecticut, have invented certain new and useful Improvements in Centering-Machines, of which the following is a full, clear, and exact description.

My invention relates to centering machines, and is particularly concerned with improvements in such machines of the double spindle class, or those in which centering of the work is effected at both ends thereof simultaneously, although it is to be understood that the invention concerns improvements which may be employed in machines of the single spindle type.

In machines of the double spindle type, owing to the presence of the spindles at either end thereof, it is impossible to introduce the work into the work-holding chucks endwise, as is done in the usual single spindle type. It is necessary, therefore, to provide work-holding chucks which may open at one side in order to receive the work between the spindles. To this end heretofore double spindle machines have been provided with chucks comprising two angular jaws adjustable toward and from each other. In this construction, however, owing to the angular form of the jaws, considerable movement thereof is necessary in order to admit the work between them, thus involving loss of time in the operation of the machine. This form of chuck is further objectionable, for the reason that it necessitates four points of contact of the jaws of the chuck with the work. This, as experience has shown, results in more or less inaccurate centering of the work with reference to the drill spindles. My invention aims to overcome these objections by providing an open sided chuck comprising coöperating jaws so constructed and arranged as to require the minimum amount of adjustment or relative movement to admit the work, and a further object is to provide a form of chuck having but three points of contact with the work, which provides for the most accurate positioning of the work possible.

A further object of my invention is to provide improved means for moving the drill spindles simultaneously toward and from the ends of the work.

With these objects in view, the invention consists in the construction and arrangement of parts, a preferred embodiment of which is illustrated in the accompanying drawings, in which—

Figure 1 is a side elevation of a centering machine embodying my improvements. Fig. 2 is a sectional view through the bed of the machine on the line 2—2 Fig. 1, showing the chuck in elevation. Fig. 3 is a plan view of the parts shown in Fig. 2. Fig. 4 is a longitudinal sectional view through one of the drill spindles and its support, showing a part of the adjusting mechanism in elevation. Fig. 5 is a diagrammatic view indicating certain adjustments of the chuck. Fig. 6 is a view in elevation of one of the parts of a spindle adjusting mechanism.

In the construction here illustrated, 1 indicates the bed of the machine having the supporting standards 2. The spindle carriages or supports 3 are mounted in the usual manner upon either end of the bed, one or both of said carriers being adjustable longitudinally of the machine in order to accommodate different lengths of work. Since the construction and manner of mounting both of said spindles in their supports is the same, a description of one will suffice for both.

Referring to Fig. 4, the drill spindle 4 is slidingly mounted at one end in a rotatable bushing 5 and is splined to said bushing at 6. Upon the outer end of the bushing 5 is mounted a pulley 7, to be connected with a suitable source of power. The inner end of the spindle is journaled in the support at 8, and is provided with any usual means for receiving and holding the centering drill 9.

In order to provide for operative movement of the drill against the work during the drilling operation, the spindle 4 is provided with a non-rotatable sleeve or block 10 engaged between the collar 11 at one end and adjustable collar 12 at the opposite end. The block or sleeve 10 is provided at its under side with a series of rack teeth 13 to be engaged by a pinion 14 journaled in the spindle support 3. The spindle 15 at the opposite end of the machine, Fig. 1, is also provided with a non-rotatable sleeve or block 16 similar to the sleeve 10, having the rack teeth 17 adapted to be engaged by a toothed block 18 adjustably mounted upon a connecting rod 19 extending longitudinally of the machine and supported in each of the spindle supports 3. The connecting rod 19 is provided with a series of rack teeth 20 engaging the pinion 14, and the shaft 21 of said pinion is provided with an operating handle 22, by which the drills may be caused to approach the work simultaneously by means of the construction just described.

Referring to Figs. 2, 3 and 5, which illustrate my improved form of work-holding chuck, 23 indicates a chuck carrier or support arranged to slide upon suitable tracks 24 on the machine frame in the usual manner, whereby said chucks may be adjusted toward or from each other according to the length of the work. The chuck proper comprises the coöperating jaws 25 and 26. As will be seen from inspection of Fig. 2, the jaw 25 is of angular form and preferably consists of two relatively adjustable members 27 and 28, mounted for adjustment upon a support 29, which rises from a base 30 slidingly mounted in the chuck carrier 23. The coöperating jaw 26 is adjustably mounted upon a support 31 rising from the base 32, also slidingly mounted upon the chuck carrier 23. To open and close the jaws for the purpose of receiving and holding the work, a right and left threaded shaft 33 is provided engaging correspondingly threaded openings in the bases 30 and 32 of the chuck jaws respectively, said shaft being journaled in the opposite sides of the chuck carrier and having a hand wheel 34 for manual operation. By constructing one of the chuck jaws in angular form, as here shown, and providing the opposite jaw with but a single work engaging surface, the work is held at but three points, thus effecting the most accurate centering of the work possible.

In order that the three points of contact of the chuck jaws with the work may be invariably maintained equidistant from the longitudinal center of the machine, notwithstanding differences in the distance between said jaws, owing to differences in the diameter of the work held thereby, it is necessary that the angular jaw upon one side and the straight jaw upon the opposite side be given different degrees of movement by the operating shaft 33. I have found by experiment that if the relative degree of movement of the angular and straight jaws respectively be the same as the ratio of the secant of the complement of one-half the angle of the angular jaw to one, this result may be accomplished. For example, if said complement be 60°, the movement of the angular jaw relatively to that of the straight jaw must be as two to one, which expresses the relation of the secant to the radius for an angle of 60° where the radius is taken as the unit. To this end, therefore, assuming that the complement of one-half the angle of the angular jaw is 60°, the pitch of the screw actuating the jaw 25 will be twice that actuating the jaw 26. It is obvious, however, that the relation of the pitch of these screws may be varied, determined by the degree of the complement of one-half the angle of the angular jaw.

In order to provide for accurate adjustment of the jaws with reference to the center of the machine, the angular jaw 25 is preferably made in two parts 27 and 28, each of which is provided with separate adjusting means 27$^a$ and 28$^a$, by which both sides of the angle may be adjusted laterally toward and from the center. Should it be necessary to raise or lower the angle presented by the angular jaw with reference to the center, this may be accomplished by positioning one of the sides slightly in advance of the other, as indicated diagrammatically in Fig. 5. By this arrangement it will be seen that when, for example, the lower jaw 28 is positioned slightly in advance of the upper member 27 of the angular jaw, the work will be elevated slightly from the position it would assume if the two members 27 and 28 were in exact register.

In order that the point of contact of the straight jaw 26 may be invariably precisely opposite the geometrical apex of the angular jaw, notwithstanding the vertical adjustment of the work as just described, the operative end of said jaw is provided with a straight vertical surface 35, which provides for such engagement with the work in all positions of vertical adjustment. The adjusting means 27$^a$ and 28$^a$ for the parts 27 and 28 respectively, also provide for accurate adjustment of the angular jaw with respect to the longitudinal center of the machine, whatever the position of engagement of the base 30 of said jaw with the adjusting shaft 33. Similar adjusting means 37 is provided for the jaw 26 relatively to its support 31.

In order to prevent the work from dropping below the chuck jaws, when introduced between them, I provide a stop 38 adjustably mounted on the support 31 of the straight jaw 26 and having an inclined supporting face 39, which extends across between the jaws and below the lower contact point of the angular jaw and the contact point of the straight jaw 26. It is to be understood that this stop is to be so adjusted that when the jaws are brought together upon the work, the latter will be raised out of contact with the stop surface 39 and will be held only by the three contact points of the jaws proper.

By reason of the relative positions of the engaging faces of the angular and straight jaw respectively, it will be seen that a considerable opening will always exist between the upper engaging face of the angular jaw and the engaging face of the straight jaw, even when the work is operatively held by said jaws. As a result of this arrangement, very little relative movement of the jaws is necessary to permit the work to be introduced therebetween or removed therefrom, and consequently very little manipulation of the actuating shaft 33 is necessary to open or close the jaws for this purpose.

As will be seen from an inspection of Fig. 2, the upper surface of the jaw 26 provides a convenient rest for the work prior to introducing the same between the jaws and also in moving the same therefrom.

While I have herein described a particular form of my invention, it is to be understood that the same may be modified in details and relative arrangement of parts within the scope of the appended claims.

What I claim is:

1. In a centering machine, a pair of oppositely arranged drill spindles, a non-rotatable rack so sleeved upon each of said spindles as to permit free rotation of the latter but fixed against relative longitudinal movement of said spindles, a pinion geared to said rack and having manually operable means, a bar meshing with said pinion at one end and having an adjustable arm mounted upon the opposite end adapted to engage the rack on the opposite spindle whereby said spindles may be simultaneously adjusted toward and from each other.

2. In a centering machine, the combination with a pair of oppositely arranged drill spindles, of two chucks, each comprising a pair of relatively adjustable jaws, said jaws constructed to present three points of contact to the work, means for adjusting said jaws constructed and arranged to maintain said points of contact at all times equidistant from a given center, and a temporary work rest adjustably mounted below said points of contact.

3. In a centering machine, the combination with a pair of oppositely arranged drill spindles, of two chucks, each comprising an angular jaw presenting two contact surfaces for the work, a coöperating jaw presenting a single contact surface for the work, an adjustable work rest extending below said contact surfaces, means for adjusting said jaws toward and from each other, said contact surfaces being so arranged as to raise the work out of engagement with said work rest when said jaws are brought into engagement with the work.

4. In a centering machine, the combination with a pair of oppositely arranged drill spindles, of two chucks, each having an angular jaw presenting two points of contact to the work, a coöperating jaw presenting a single point of contact to the work, an adjustable work rest extending below said points of contact, means for adjusting said jaws toward and from each other, said points of contact being so arranged that an adjustment of said jaws into operative engagement with the work will move the work on said angular jaw out of engagement with said rest.

5. In a centering machine, the combination with a pair of oppositely arranged drill spindles, of two chucks, each comprising an angular jaw and a coöperating straight jaw and means for relative adjustment of the sides of the angle of said angular jaw to raise or lower the work engaged between said jaws when said jaws are brought into operative engagement with the work.

6. In a centering machine, the combination with a pair of oppositely arranged drill spindles, of two chucks, each having an angular jaw presenting two points of contact to the work and a coöperating jaw presenting a single point of contact to the work, means for adjusting one of the points of contact on said angular jaw relatively to the other whereby the position of the work relative to the said drill spindles may be adjusted by movement of said jaws into operative engagement with the work.

7. In a centering machine, the combination with a pair of oppositely arranged drill spindles, of two chucks, each comprising an angular jaw, the sides of the angle of which are relatively adjustable, a coöperating straight jaw and means for maintaining the points of contact of said straight jaw with the work at all times opposite the apex of the angle of the angular jaw.

8. In a centering machine, the combination with a pair of oppositely arranged drill spindles, of two chucks, each comprising an angular jaw and a straight jaw, said jaws presenting three points of contact for the work and said jaws being so constructed and arranged as to present an opening for the reception and removal of the work, one of said jaws having a rest for the work adjacent said opening.

9. The combination with a pair of oppositely arranged drill spindles, of two chucks, each comprising an angular jaw and a straight jaw, said jaws presenting three points of contact for the work, said jaws being constructed and arranged to present an open side for the reception and removal of the work and said straight jaw having a work rest adjacent said opening.

10. In a centering machine, the combination with a drill spindle of chucks, one comprising a pair of relatively adjustable jaws, said jaws constructed to present three points of contact to the work, means for adjusting said jaws constructed and arranged to maintain said points of contact at all times equidistant from a given center, and a temporary work rest adjustably mounted below said points of contact of each chuck.

11. A chuck for centering machines and the like, comprising a pair of relatively adjustable jaws, said jaws constructed and arranged to present three points of contact to the work, means for adjusting said jaws constructed and arranged to maintain said points of contact at all times equidistant from a given center, and a temporary work rest adjustably mounted below said points of contact.

12. A chuck for centering machines and the like comprising an angular jaw and a co-operating straight jaw, means for relative adjustment of the sides of the angle of said angular jaw to raise or lower the work engaged between said jaws, when said jaws are in operative engagement with the work.

LUCIUS E. WHITON.

Witnesses:
  JACOB H. GUMBLE,
  LUTHER G. STEBBINS.

Copies of this patent may be obtained for five cents each, by addressing the "Commissioner of Patents, Washington, D. C."